United States Patent [19]

Alexander, Jr. et al.

[11] Patent Number: 5,909,441
[45] Date of Patent: Jun. 1, 1999

[54] APPARATUS AND METHOD FOR REDUCING FRAME LOSS IN ROUTE SWITCHED NETWORKS

[75] Inventors: Cedell Adam Alexander, Jr., Durham; Edward Joel Rovner; Sonia Kiang Rovner, both of Chapel Hill, all of N.C.

[73] Assignee: International Business Machines Corporation, Armonk, N.Y.

[21] Appl. No.: 08/840,313

[22] Filed: Apr. 11, 1997

[51] Int. Cl.$^6$ .................................................. H04L 12/28
[52] U.S. Cl. ........................ 370/395; 370/401; 370/402; 370/403; 370/404
[58] Field of Search ................................... 370/401, 402, 370/403, 404, 409, 395, 397, 399, 400, 389; 395/200.75

[56] References Cited

U.S. PATENT DOCUMENTS

| | | | |
|---|---|---|---|
| 5,329,527 | 7/1994 | Ujihashi et al. | 370/85.13 |
| 5,394,402 | 2/1995 | Ross | 370/94.1 |
| 5,570,084 | 10/1996 | Ritter et al. | 340/825.05 |
| 5,600,644 | 2/1997 | Chang et al. | 370/404 |

*Primary Examiner*—Jeffery A. Hofsass
*Assistant Examiner*—Mitchell Slavitt
*Attorney, Agent, or Firm*—John J. Timar; Felsman, Bradley, Gunter & Dillon, LLP

[57] ABSTRACT

To ensure a LES issues address resolution responses when necessary, an association between a MAC/ATM address pair and an intersubnet shortcut virtual channel connection (VCC) is registered. When the LES receives a first data frame being sent from a first station to a second station, with the second station having a MAC address associated with a shortcut VCC, a second data frame is created. The second data frame has as a source address the MAC address. The second frame is sent to devices associated with the first station so that the devices may learn the origination point for the second station and can issue messaging necessary to establish an shortcut VCC. In addition, frame loss reduction in an ATM communications network is accomplished by registering an association between a MAC address of a router associated with a MAC/ATM address pair, and a shortcut VCC. After the association is registered, a data frame being sent from a first station to a second station is received. The second station has the same MAC address as the MAC/ATM address pair. The destination MAC address of the data frame is replaced with the MAC address of the router, wherein the data frame can now be delivered. Also, a first station is prevented from having to wait to send data to a second station over a newly created shortcut VCC by registering an association between a MAC/ATM address pair and a shortcut VCC. Next, a flush request message from an edge device on an ELAN is received. The flush request has a destination ATM address equal to the ATM address of the MAC/ATM address pair. A flush response message is sent to the edge device, where upon receiving the flush response message, the edge device will start sending data from the first station to the second station over the newly created shortcut VCC.

17 Claims, 4 Drawing Sheets

APPARATUS AND METHOD FOR REDUCING FRAME LOSS IN ROUTE SWITCHED NETWORKS

BACKGROUND OF THE INVENTION

1. Technical Field

The present invention relates generally to transmitting data over asynchronous transfer mode (ATM) networks. More specifically, the present invention relates to preventing frame loss in route switched ATM networks.

2. Description of the Related Art

Route switched networks refer to networks where routing and forwarding decisions are distributed to the edge of a switched/bridged local area network (LAN) infrastructure. Network 100 shown in FIG. 1 is an example of a route switched network. In network 100, the edge devices (e.g., LAN switches 110 and 112) bridge traffic between legacy LAN ports and emulated LAN (ELAN) ports on ATM network 124. In addition, Next Hop Resolution Protocol (NHRP) Client functions are included in legacy LAN stations 102 and 104, with MAC addresses MAC_a and MAC_b, respectively. This arrangement of devices allows intersubnet shortcut data direct virtual channel connections (shortcut VCCs) to be established. Establishing a shortcut VCC allows the edge devices to utilize their bridging capabilities along with the high-speed switching characteristics of ATM network 124 to create efficient layer-2 connections between stations resident on different layer-3 subnets. Operating in this manner allows for routers in network 100 to be removed from the steady-state data paths and allows the maximum benefits of the switched ATM network to be realized.

When LAN station 102 wishes to establish a shortcut VCC to send information to LAN station 104, LAN station 102 issues a NHRP Resolution Request to determine the MAC address associated with the internet protocol (IP) address of LAN station 104. In network 100, the IP address of LAN station 104 is 9.1.3.1 (while the IP address of LAN station 102 is 9.1.1.1). LAN station 102 sends this NHRP Resolution Request along the routed path to NHRP server 116.

When NHRP server 116 receives the NHRP Resolution Request, NHRP server 116 forwards the Resolution Request to NHRP server 118. NHRP server 118 returns to NHRP server 116 a NHRP Resolution Reply that contains the MAC and ATM addresses associated with LAN station 104. NHRP server 116 then registers the MAC-to-ATM address mapping with LAN emulation server/broadcast and unknown server (LES/BUS) 114, and returns a NHRP Resolution Reply to LAN station 102. This Reply contains the MAC address associated with the IP address of LAN station 104.

LAN station 102 then uses the received MAC address of LAN station 104 as the destination MAC address of frames transmitted to LAN station 104. Information sent from LAN station 102 to LAN station 104 is then delivered via the normal layer 2 procedures. These procedures include LAN switch 110 issuing a LAN emulation address resolution protocol (LE_ARP) Request for the ATM address associated with LAN station 104. In response to the LE_ARP Request, LES/BUS 114 responds with a LE_ARP_RESPONSE containing the ATM address of LAN switch 112. LAN switch 110 then initiates signaling to set up a shortcut VCC to the ATM address of LAN switch 112. After the signaling process is finished, frames destined for the MAC address of LAN station 104 are delivered to LAN station 104 via LAN switch 112 over this shortcut VCC.

Route switched network 100 works well after the shortcut VCC is established. However, frames can be lost before the shortcut VCC has been established due to any one of several potential problems. First, some edge devices will not issue a LE_ARP_REQUEST for a given destination MAC address until a frame has been received from an ELAN with the destination MAC address as the source MAC address (i.e., until the bridge has learned that the MAC address resides on a particular ELAN). In network 100 LAN switch 110 may not issue a LE_ARP_REQUEST for LAN station 104 on ELAN 112 until it receives a frame from ELAN 112 with the source MAC address of LAN station 104. Not all edge devices behave in the manner described above, however, some have been programmed not to issue a LE_ARP_REQUEST in the above situation to avoid generating unnecessary traffic on the ATM network.

Another problem can occur during the interval after the destination MAC address has been returned to the NHRP client, but before the shortcut VCC has been established. During this interval, any frames transmitted by the source LAN station to the destination MAC address will be forwarded to the LAN emulation broadcast and unknown server (BUS) by the edge device. However, these frames will not be delivered to the correct destination. In network 100, frames transmitted to the MAC address MAC_b by LAN station 102 will be forwarded to LES/BUS 114 by LAN switch 110 if the shortcut VCC has not yet been established. LES/BUS 114 will broadcast these frames to all stations on ELAN 112, but, LAN station 104 will not receive these frames.

Another problem arises when the shortcut VCC has been established and the edge device tries to implement the LAN emulation flush protocol when switching from the BUS data path to the shortcut VCC. The flush protocol will fail since the destination ATM device is not resident on the ELAN and therefore cannot respond to the LE_FLUSH_REQUEST. As a result, the edge device will wait for the Path Switching Delay period (which is a LAN emulation client configuration parameter that defaults to 6 seconds) before using the newly established shortcut VCC. Frames transmitted during this interim 6 second period may be discarded by the edge device. In network 100, when the shortcut VCC has been established, LAN switch 110 may send a LE_FLUSH_REQUEST to LES/BUS 114 with the ATM address of LAN switch 112 as the target ATM address. LES/BUS 114 will broadcast the LE_FLUSH_REQUEST message to ELAN 112, but no station on ELAN 112 will reply. Consequently, LAN switch 110 will not transmit any frames destined for MAC_b for a period of time equal to the Path Switching Delay. Frames transmitted during this interval to MAC_b by LAN station 102 may be discarded by LAN switch 110.

The first problem is more serious than the next two because it creates a situation where a shortcut VCC will never be established. The second and third problems are not as serious, since they are limited to the initial stages of the shortcut VCC establishment. However, these problems are undesirable and detract from the value of a route switched network.

Thus, it would be desirable to provide a route switch network which did not suffer from any of the three problems mentioned above. In such a network, edge devices would issue a LE_ARP_REQUEST for a given destination MAC address regardless of whether a frame has been received from an ELAN with that MAC address as the source MAC address. Also, the improved route switched network would ensure that frames were transmitted to the correct destination during the interval after the destination MAC address has been returned to the NHRP client, but before the shortcut VCC had been established. Finally, this network would not delay edge devices for the Path Switching Delay period before using a newly established shortcut VCC.

SUMMARY OF THE INVENTION

It is therefore one object of the present invention to reduce frame loss in route switched networks.

It is another object of the present invention for edge devices to issue a LE_ARP_REQUEST in the appropriate situations.

It is yet another object of the present invention to deliver frames to the correct destination MAC address during the interval between returning the destination MAC address and the establishment of the shortcut VCC.

It is still another object of the present invention not to require edge devices to wait for a period of time defined by the Path Switching Delay before using a newly established shortcut VCC.

These and other objects are achieved as follows. To ensure a LES issues address resolution responses when necessary, an association between a MAC/ATM address pair and a shortcut virtual channel connection (VCC) is registered. When the BUS receives a first data frame being sent from a first station to a second station, with the second station having a MAC address associated with a shortcut VCC, a second data frame is created. The second data frame has as a source address the MAC address. The second frame is sent to devices associated with the first station so that the devices may learn the origination point for the second station and can issue messaging necessary to establish a shortcut VCC.

In addition, frame loss prevention in an ATM communications network is accomplished by registering an association between a MAC address of a router associated with a MAC/ATM address pair, and a shortcut VCC. After the association is registered, a data frame being sent from a first station to a second station is received. The second station has the same MAC address as the MAC/ATM address pair. The destination MAC address of the data frame is replaced with the MAC address of the router, wherein the data frame can now be delivered.

Also, the objectives of the present invention are achieved by providing a method for preventing a first station from having to wait to send data to a second station over a newly created shortcut VCC. Initially, an association between a MAC/ATM address pair and a shortcut VCC is registered. Next, a flush request message from an edge device on an ELAN is received. The flush request has a destination ATM address equal to the ATM address of the MAC/ATM address pair. A flush response message is sent to the edge device, where upon receiving the flush response message, the edge device will start sending data from the first station to the second station over the newly created shortcut VCC.

BRIEF DESCRIPTION OF THE DRAWINGS

The novel features believed characteristic of the invention are set forth in the appended claims. The invention itself, however, as well as preferred mode of use, further objectives and advantages thereof, will best be understood by reference to the following detailed description of an illustrative embodiment when read in conjunction with the accompanying drawings, wherein:

DETAILED DESCRIPTION OF PREFERRED EMBODIMENT

Figure 1:
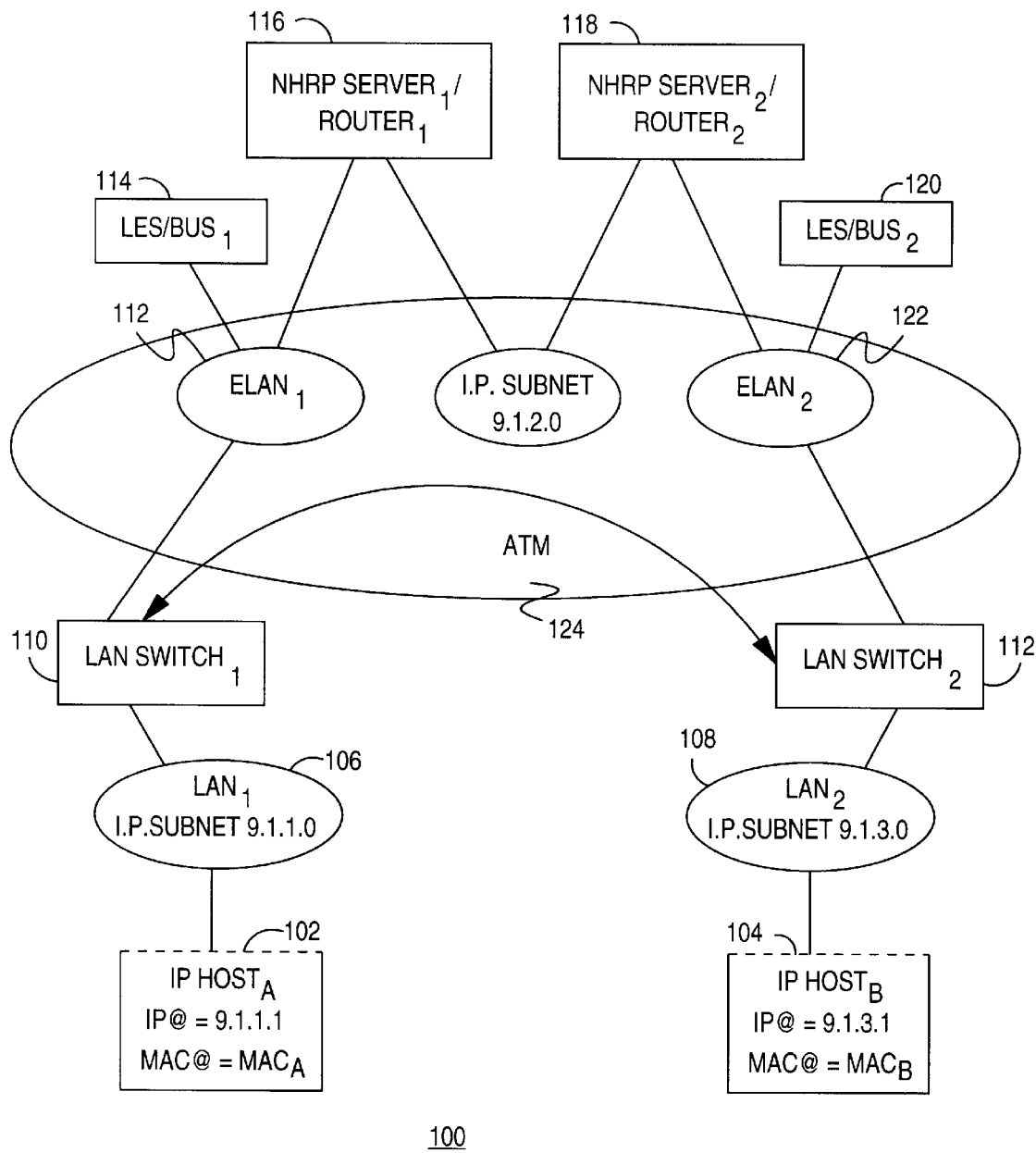
FIG. 1 illustrates a prior art layout of a route switched ATM network.
Figure 2:
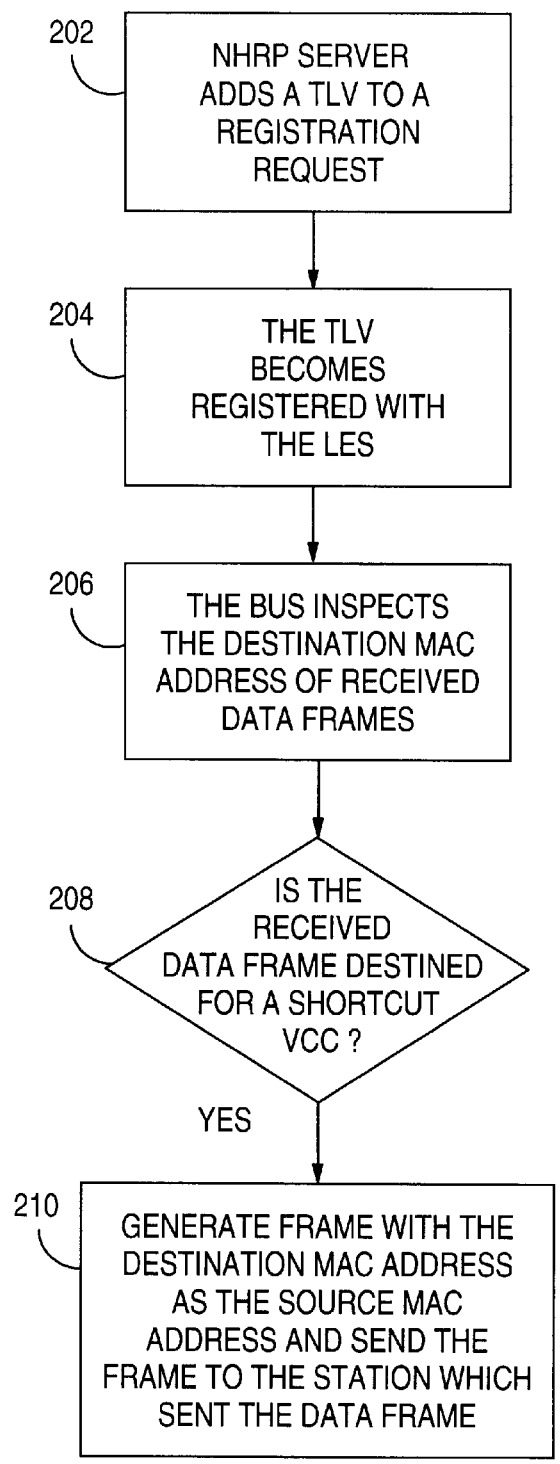
FIG. 2 is a flowchart illustrating a method according to the present invention.

FIG. 2 is a flowchart illustrating a method which can be implemented using the network shown in FIG. 1. The method described in FIG. 2 ensures that all edge devices will issue a LE_ARP_REQUEST for a given destination MAC address. The method described in FIG. 2 has a NHRP server modifying a standard LE_REGISTER_REQUEST message. This type of message is used by NHRP servers to register MAC-to-ATM address mappings with LESs. The modification to the LE_REGISTER_REQUEST message involves the addition of a type-length-value (TLV) message. This TLV message identifies the particular MAC-to-ATM address mapping as being associated with a shortcut VCC. This TLV message also includes the protocol type (e.g., IP) as well as the source protocol address.

As shown in FIG. 2, the NHRP server adds a TLV to a LE_REGISTER_REQUEST message (202). This TLV message specifies the MAC/ATM address pair found in the LE_REGISTER_REQUEST as being associated with a shortcut VCC. Next, the message is sent from the NHRP server to the LES to register a MAC-to-ATM address mapping, as well as to register the information contained in the TLV message (204).

After a specific MAC-to-ATM address mapping is associated with a shortcut VCC in the LES, the BUS associated with the LES may receive a data frame. The BUS will inspect the destination MAC address of the received data frame to determine if the frame is destined for a MAC address associated with a shortcut VCC (206). if such a frame is received, and if the protocol type and source protocol address also match the registered mapping (208), the BUS will generate a frame that has the destination MAC address as the source MAC address and will transmit this frame to the LAN station which sent the data frame (210).

This method solves the problem described above because the LAN switch will now have seen a frame which contained the destination MAC address as a source MAC address. With reference to FIG. 1 and in the context of LAN station 102 sending data to LAN station 104, NHRP server 116 includes a TLV message as described above with its LE_REGISTER_REQUEST message when registering a MAC-to-ATM mapping with LES/BUS 114. LES/BUS 114 notes that the particular MAC/ATM address pair included in the LE_REGISTER_REQUEST message is associated with a shortcut VCC. Subsequently, when LES/BUS 114 receives a frame from LAN station 102 which has the destination MAC address associated with a shortcut VCC (i.e., the MAC address of LAN station 104), LES/BUS 114 generates a frame which has as a source MAC address the destination MAC address. LES/BUS 114 sends this frame to LAN switch 110.

LAN switch 110 now has seen a frame with the destination MAC address being used as a source MAC address. LAN switch 110 then correctly issues a LE_ARP_REQUEST to the LES/BUS 114, thereby allowing a shortcut VCC to be established.

Figure 3:
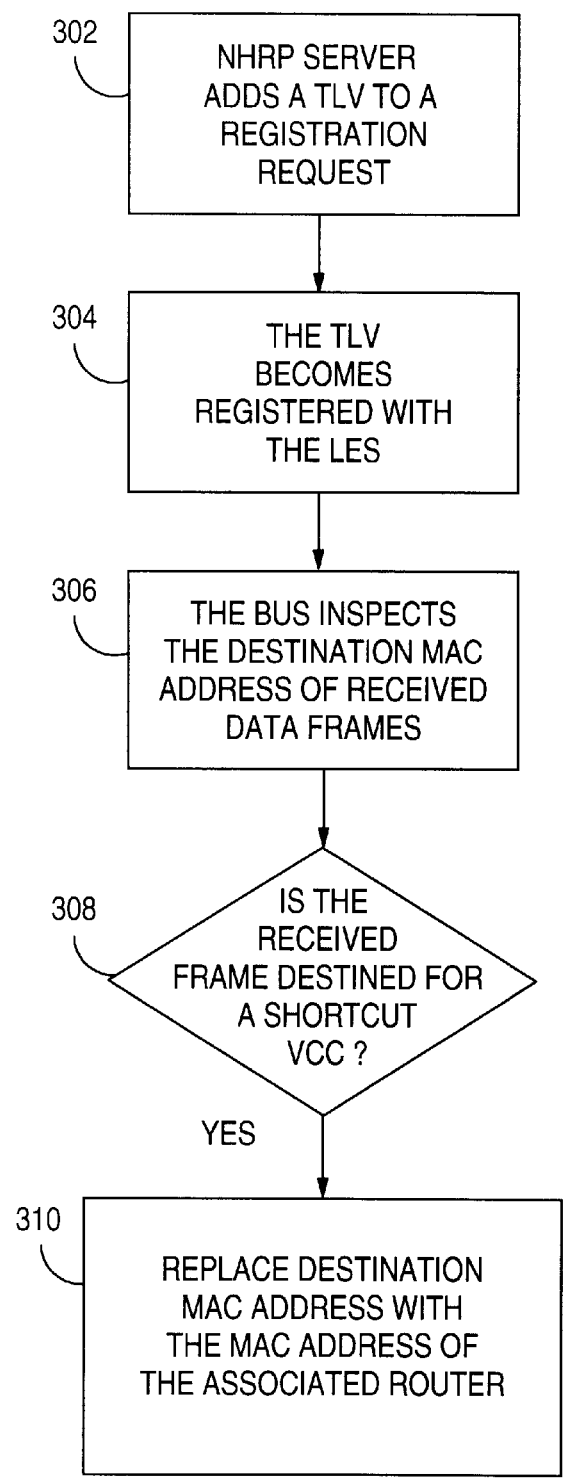
FIG. 3 is a second flowchart illustrating a method according to the present invention.

FIG. 3 is a flowchart which illustrates a method for ensuring that frames transmitted before a shortcut VCC has been established will be correctly delivered. Like the method illustrated in FIG. 2, this method can be implemented using the network shown in FIG. 1. The method described in FIG. 3 solves the problem of frames not being correctly delivered before a shortcut VCC is established by registering the MAC address of a router associated with a MAC/ATM address pair with a LES. Initially, a NHRP server will add a TLV which includes the MAC address of an associated router to a LE_REGISTER_REQUEST message (302). The information contained in this TLV message can be combined with the TLV message described above. This MAC address will specify the address of a router which is associated with the MAC/ATM address pair included in the LE_REGISTER_REQUEST message. The LE_REGISTER_REQUEST message, along with the information in the TLV message, is then registered in a LES (304).

When the BUS associated with the LES receives a data frame (306), the BUS will inspect the data frame to determine if it is destined for a shortcut VCC (308). If the received data frame is destined for a shortcut VCC, the BUS will redirect the frame to the router associated with the destination MAC address by replacing the destination MAC address with the MAC address of the router specified in the TLV message which accompanied the LE_REGISTER_REQUEST message. The frame will then be sent to the correct destination via the router instead of being lost.

As applied to FIG. 1, if LAN station 102 was trying to send data to LAN station 104, NHRP server 116 would register the MAC address of router 116 in LES/BUS 114. This registration would be done along with the registering of the MAC-to-ATM address mapping for LAN station 104. Subsequently, when LAN station 102 sent data to LAN station 104, and a shortcut VCC had not yet been established, LES/BUS 114 would redirect the data frames being sent by LAN station 102 to router 116 by replacing the destination MAC address of these frames with the MAC address of router 116. This substitution process allows the frames being sent by LAN station 102 to reach LAN station 104.

Figure 4:
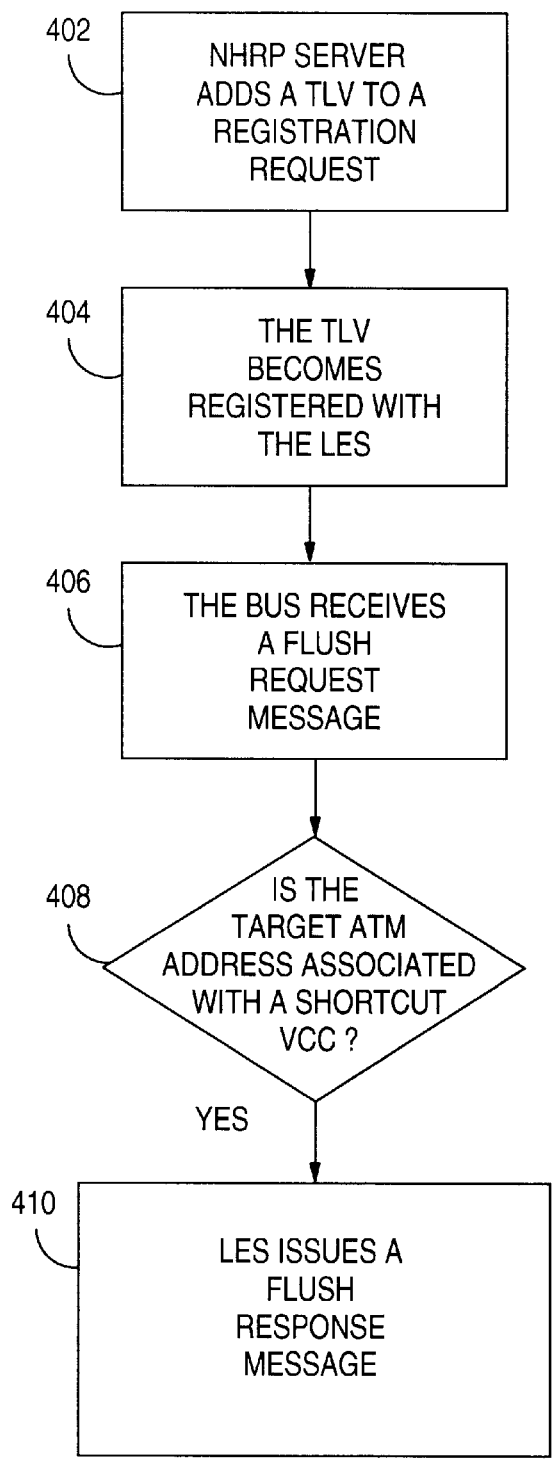
FIG. 4 is a third flowchart illustrating a method according to the present invention.

FIG. 4 is a flowchart which illustrates a method for eliminating the need for edge devices to wait for the Path Switching Delay period. Like the methods shown in FIGS. 2 and 3, the method depicted in FIG. 4 can be implemented on the network shown in FIG. 1. The method shown in FIG. 4 allows a LES/BUS combination to monitor for LE_FLUSH_REQUEST messages. When a LES detects a LE_FLUSH_REQUEST with a target ATM address that is associated with a shortcut VCC, the BUS will respond with a LE_FLUSH_RESPONSE. This response by the BUS allows edge devices to begin using the newly established shortcut VCC in a timely manner, thereby avoiding unnecessary frame loss.

Initially, the NHRP server informs the LES that an ATM address is associated with a shortcut VCC (402). This is done by adding a TLV message to the standard LE_REGISTER_REQUEST message. The information in the TLV message is then stored by the LES (404). Steps 402 and 404 are identical to steps 202 and 204 shown in FIG. 2. Although these two steps are identical to those shown in FIG. 2, the method shown in FIG. 4 can be carried out independently or in conjunction with the other methods shown in FIGS. 2 and 3.

Sometimes after this registration, the BUS may receive a flush request message (406). The BUS will analyze the target ATM address of this flush request message to determine if it is associated with a shortcut VCC (408). If the target ATM address is associated with a shortcut VCC, the LES will issue a flush response message (410). The LES issues this flush response message instead of the target ATM device because the target ATM device will never receive the flush request message. Since the LES/BUS combination can respond to a flush request message very quickly, edge devices can begin to use the newly established shortcut VCC almost immediately, rather than having to wait for the Path Switching Delay period to expire.

As applied to FIG. 1, and in the context of LAN station 102 sending information to LAN station 104, NHRP server 116 would inform LES/BUS 114 that the ATM address of LAN switch 112 is associated with a shortcut VCC. Once LAN switch 110 established a shortcut VCC with LAN switch 112, it could attempt to send a LE_FLUSH_REQUEST to LAN switch 112 before switching from the BUS data path to the shortcut VCC data path. When this LE_FLUSH_REQUEST is received by LES/BUS 114, LES/BUS 114 will recognize that the target ATM address of this message is meant for an ATM address associated with a shortcut VCC. LES/BUS 114 will then form a LE_FLUSH_RESPONSE, and will send this response to LAN switch 110. LAN switch 110 will then begin using the shortcut VCC instead of waiting for the Path Switching Delay period to expire.

While the invention has been particularly shown and described with reference to a preferred embodiment, it will be understood by those skilled in the art that various changes in form and detail may be made therein without departing from the spirit and scope of the invention.

We claim:

1. A method for establishing an intersubnet shortcut virtual channel connection (VCC) in an asynchronous transfer mode (ATM) communications network, comprising:

registering an association between a MAC/ATM address pair and the intersubnet shortcut virtual channel connection (VCC), the MAC/ATM address pair having a MAC address and an ATM address;

receiving a first data frame being sent from a first station to a second station, wherein the second station is addressed using the MAC address;

creating a second data frame in response to receiving the first data frame, wherein the second data frame has as a source address the MAC address; and sending the second data frame to the first station, wherein devices associated with the first station learn an origination point for the second station and can issue messaging necessary to establish the intersubnet shortcut VCC.

2. The method as defined in claim 1, wherein the sending step includes sending the second data frame to an originating local area network (LAN) switch, wherein the originating LAN switch learns which emulated LAN (ELAN) is associated with the MAC address.

3. The method as recited in claim 1, further comprising:

sending an address resolution protocol request from an originating LAN switch to a local area network emulation server (LES); and returning the ATM address of a destination LAN switch to the LAN switch, thereby allowing the originating LAN switch to establish the intersubnet shortcut VCC with the destination LAN switch.

4. The method as defined in claim 1, wherein the registering step occurs in a local area network emulation server (LES).

5. The method as defined in claim 4, wherein the registering step includes using a server to create a type-length-value message and including this message with a registration request message being sent to the LES.

6. A method for reducing frame loss in an asynchronous transfer mode (ATM) communications network, comprising:

registering an association between a router MAC address of a router associated with a MAC/ATM address pair, and an intersubnet shortcut virtual channel connection (VCC), the MAC/ATM address pair having a MAC address and an ATM address;

receiving a data frame being sent from a first station to a second station, wherein the second station is addressed using the MAC address and the data frame has a destination MAC address equivalent to the MAC address; and replacing the destination MAC address of the data frame with the router MAC address, wherein the data frame can now be delivered.

7. The method as defined in claim 6, wherein the replacing step is performed by a broadcast and unknown server.

8. The method as defined in claim 6, further comprising: transmitting the data frame with the replaced MAC address to the destination MAC address via the router.

9. The method as defined in claim 6, wherein the registering step occurs in a local area network emulation server (LES).

10. The method as defined in claim 9, wherein the registering step includes using a server to create a type-length-value message and including this message with a registration request message being sent to the LES.

11. A method for preventing a first station from having to wait to send data to a second station over a newly created intersubnet shortcut virtual channel connection (VCC), comprising:

registering an association between a MAC/ATM address pair and an intersubnet shortcut virtual channel connection (VCC), the MAC/ATM address pair having a MAC address and an ATM address;

receiving a flush request message from an edge device on an emulated local area network (ELAN), wherein the flush request message has a destination ATM address equal to the ATM address of the MAC/ATM address pair; and sending a flush response message to the edge device, where upon receiving the flush response message, the edge device starts sending data from the first station to the second station over the newly created intersubnet shortcut VCC.

12. The method as defined in claim 11, wherein the receiving step occurs in a broadcast and unknown server.

13. The method as defined in claim 11, wherein the registering step and the sending step occur in a local area network emulation server (LES).

14. The method as defined in claim 13, wherein the registering step includes using a server to create a type-length-value message and including this message with a registration request message being sent to the LES.

15. An asynchronous transfer mode (ATM) communications network, comprising:

a emulated local area network (ELAN) connected to a local area network emulation server (LES), a broadcast and unknown server (BUS), a server, and a LAN switch, with a first station being attached to the LAN switch;

a second station connected to the ATM communications network, the second station having a MAC address and an ATM address;

the ATM communications network being operable in a first mode of operation, wherein the server registers an association between a MAC/ATM address pair and an intersubnet shortcut virtual channel connection (VCC), the MAC/ATM address pair having the MAC address and the ATM address of the second station;

the first station sends a first data frame destined for the second station that is received by the BUS;

the BUS creates a second data frame in response to receiving the first data frame, wherein the second data frame has as a source address the MAC address; and the BUS sends the second data frame to the first station, wherein devices associated with the first station learn an origination point for the second station and can issue messaging necessary to establish the intersubnet shortcut VCC.

16. An asynchronous transfer mode (ATM) communications network, comprising:

a emulated local area network (ELAN) connected to a local area network emulation server (LES), a broadcast and unknown server (BUS), a server, and a LAN switch, with a first station being attached to the LAN switch;

a second station connected to the ATM communications network, the second station having a MAC address an ATM address;

the ATM communications network being operable in a first mode of operation, wherein the server registers an association between a router MAC address of a router associated with a MAC/ATM address pair, and an intersubnet shortcut virtual channel connection (VCC), the MAC/ATM address pair having the MAC address and the ATM address of the second station;

the first station sends a data frame destined for the second station that is received by the BUS; and the LES replaces the destination MAC address of the data frame with the router MAC address, wherein the data frame can now be delivered.

17. An asynchronous transfer mode (ATM) communications network, comprising:

an emulated local area network (ELAN) connected to a local area network emulation server (LES), a broadcast and unknown server (BUS), a server, and a LAN switch, with a first station being attached to the LAN switch;

a second station connected to the ATM communications network, the second station having a MAC address and an ATM address;

the ATM communications network being operable in a first mode of operation, wherein the server registers an association between a MAC/ATM address pair and an intersubnet shortcut virtual channel connection (VCC), the MAC/ATM address pair having the MAC address and the ATM address of the second station;

the BUS receives a flush request message from the LAN switch, wherein the flush request message has a destination ATM address equal to the ATM address of the MAC/ATM address pair; and the BUS sends a flush response message to the LAN switch, where upon receiving the flush response message, the LAN switch starts sending data from the first station to the second station over the intersubnet shortcut VCC.

* * * * *